US006315315B1

(12) United States Patent
Seale

(10) Patent No.: US 6,315,315 B1
(45) Date of Patent: Nov. 13, 2001

(54) GOOSENECK TRAILER LOCK

(76) Inventor: Joe Dwyer Seale, 4510 Brook Woods, Houston, TX (US) 77092

( * ) Notice: Subject to any disclaimer, the term of this patent is extended or adjusted under 35 U.S.C. 154(b) by 0 days.

(21) Appl. No.: 09/612,880

(22) Filed: Jul. 10, 2000

(51) Int. Cl.[7] ................................................ B60D 1/28
(52) U.S. Cl. ................................................ 280/507; 70/14
(58) Field of Search ................................ 280/507, 425.2, 280/417.1, 432, 441.2; 70/14, 232, 258

(56) References Cited

U.S. PATENT DOCUMENTS

| 3,226,133 | * | 12/1965 | Geresy | 280/507 |
|---|---|---|---|---|
| 3,492,023 | * | 1/1970 | Thompson | 280/507 |
| 3,977,221 | * | 8/1976 | Foote | 280/507 |
| 4,291,557 | * | 9/1981 | Bulle et al. | 280/507 |
| 4,325,237 | * | 4/1982 | Menzie | 280/507 |
| 5,322,316 | * | 6/1994 | Wheeler | 280/507 |
| 5,410,893 | * | 5/1995 | Easterwood | 280/507 |

FOREIGN PATENT DOCUMENTS

| 282688 | * | 6/1989 | (EP) | 280/507 |
|---|---|---|---|---|
| 318653 | * | 6/1989 | (EP) | 280/507 |

* cited by examiner

Primary Examiner—Daniel G. DePumpo

(57) ABSTRACT

A Gooseneck Trailer Lock that obstructs a trailer hitch coupling mechanism and prevents the attachment to the ball of a towing vehicle. The locking device is inserted into the coupling mechanism, the slide of the coupling mechanism is moved to the closed position causing the top portion of the lock to engage the ½ inch lip on the inside of the mechanism while the body of the lock remains in the 2 5/16 inch opening of the slide mechanism, the non-drillable barrel lock is locked and the key removed. The entire coupling mechanism is filled, preventing the insertion of the towing ball, thus preventing an unattached trailer from being attached to an unauthorized vehicle. The locking device is simple, durable, effective, and easy to use.

1 Claim, 5 Drawing Sheets

GOOSENECK TRAILER LOCK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE INDEX

Not Applicable

BACKGROUND OF THE INVENTION

Gooseneck trailers attached to towing vehicles are commonly used to transport machinery, livestock, and other goods as well as recreational vehicles. When the trailer is separated from the towing vehicle the trailer and its goods are subject to theft by the unauthorized coupling to a towing vehicle. Gooseneck trailer hitches are of a limited variety, frequently being of standard type or shapes. Examples are kingpin hitches which consist of cylindrical posts containing circumferential recesses and fit into matching openings mounted on the towing vehicle; and gooseneck hitches. The typical or standard gooseneck hitch consists of a coupler attached to the lower end of a generally vertical post, the upper end is either attached to the trailer or to a horizontal beam which is attached to the trailer. The trailer hitch coupler at the lower end of the post connects with a protruding device on the towing vehicle. The coupler itself consists of different shapes and configurations but generally has a fixed plate attached to the vertical post and a moveable plate that is offset to reduce the diameter of the opening when closed, to lock around the ball (protruding device) on the towing vehicle. Both the fixed plate and the moveable plate have a 2 5/16" diameter hole that aligns when the coupler is in the receiving or unlocked position and the ball (protruding device) on the towing vehicle has a maximum 2 5/16" diameter that fits in the receptacle formed by the coupler. When the coupler is moved to the closed or locked position the diameter of the hole in the coupler is reduced by at least ½" effectively securing or locking the ball (protruding devise) of the towing vehicle with the coupler.

There is a need for a durable, inexpensive, simply operated, effective hitch lock for trailers with gooseneck hitches. Locking devices for king-pin or ball and socket hitches cannot be used on gooseneck couplers, because such locking devices will not fit around or be attachable to the coupler of a gooseneck hitch. The gooseneck trailer hitch lock should completely fill the coupler cavity to obstruct the coupler and prevent the undesired coupling with a towing vehicle. Such locking device should further contain a secure internal means to prevent its undesired removal from the coupler.

The prior art has been principally directed toward locking devices for gooseneck trailer hitch couplers that surround the coupler, obstruct the insertion of the towing ball, and utilize either a built-in lock or an external padlock; a devise that is inserted into the coupler opening but is secured by an external device that fits over the coupler locking arm and utilizes a padlock; and devices that fill the coupler with a ball that is attached to a telescoping pole that is attached to the forward end of the trailer with a padlock.

U.S. Pat. No. 5,255,545 issued Oct.26, 1993 to Wheeler for Gooseneck trailer hitch locking device, U.S. Pat. No. 5,322,316 issued Jun. 21, 1994 to Wheeler for Anti-theft coupler device, and U.S. Pat. No. D402,602 issued Dec. 15, 1998 to Niswanger for Universal Gooseneck Trailer Lock are of the type that surround the coupler.

U.S. Pat. No. 5,513,871 issued May 7, 1996 to Johnson for Gooseneck Trailer Hitch Locking Device is of the type that is inserted into the coupler but locks externally to the coupler locking arm and is secured with a padlock.

U.S. Pat. No. 5,520,030 issued May 28, 1996 to Muldoon is the telescoping pole type.

All of the above inventions and patents show a vulnerability either with multiple parts that are easily misplaced and difficult to assemble, padlocks and chains which are easily cut with bolt cutters, massive devices that are hard to store when not in use, or failure to obstruct the coupler opening and the coupler movement itself.

Therefore, it is apparent that a need still exists for a simple, easy to use unitary device that obstructs the gooseneck coupler opening while preventing the movement of the coupler mechanism utilizing a secure internal locking device that prevents the gooseneck trailer from being attached to a towing vehicle and unauthorized use.

BRIEF SUMMARY OF THE INVENTION

The locking device disclosed and claimed is for use with a trailer gooseneck, the trailer gooseneck having a post with a upper and lower ends, the upper end being attached to a trailer and the lower end being attached to a coupler, the coupler having a 2 5/16" receptacle and being adapted for releasable attachment to a towing vehicle, said locking device comprising obstruction means for cooperation with the coupler to prevent undesired coupling of the coupler to the towing vehicle and securing means cooperating with said obstruction means to prevent undesired removal of said obstruction means from the coupler.

The anti-theft coupler device disclosed and claimed in one preferred form involves a single unit that is inserted into the coupler, just as the ball is inserted into the coupler, the coupler closing mechanism is activated to the closed position which causes the top portion of the lock to remain in place and the bottom portion of the lock travels with the slide mechanism. The barrel lock is locked and the invention is secured in the coupler. The lip of the coupler closing mechanism prevents the removal of the lock until unlocked.

DETAILED DESCRIPTION OF THE INVENTION

Figure 1:
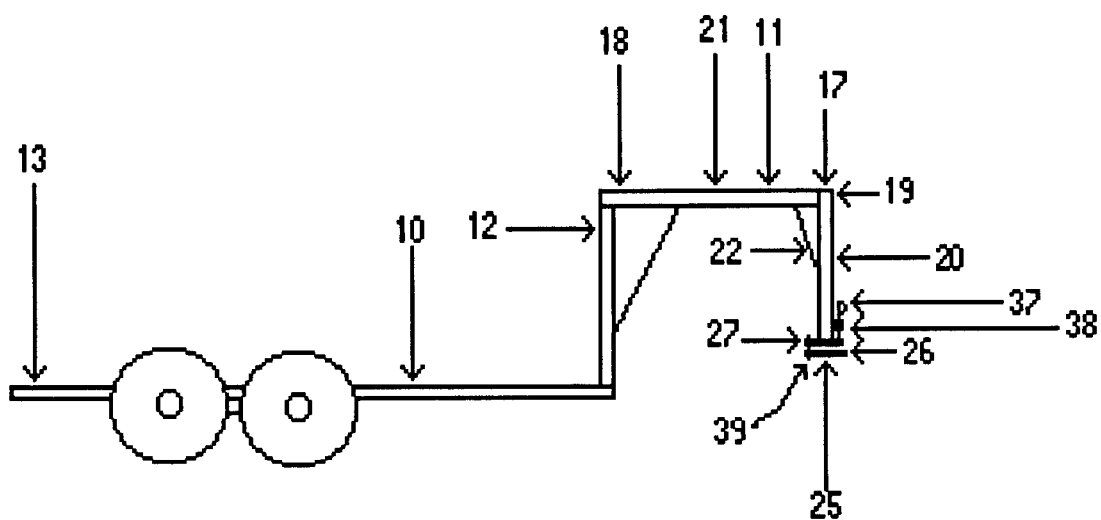
FIG. 1 is a side view of a Gooseneck Trailer.

As required, detailed embodiments of the present invention are disclosed herein; however, it is to be understood that the enclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure. With the use of a metal turning lathe and a vertical milling machine as the primary shaping tools for the invention; it is constructed of metal (cold rolled steel, stainless steel, or aluminum alloy).

Referring to the drawings in more detail:

FIG. 1 generally shows a trailer 10 with a gooseneck trailer hitch 11 mounted on a front facing portion 12 of the trailer 10, the front facing portion 12 being opposite a rear facing portion 13 of the trailer 10. The front facing portion 12 of trailer 10 is connected to a towing or pull vehicle via gooseneck trailer hitch 11 and is the leading or forward aspect of trailer 10 when pulled in a forward direction by the towing or pulling vehicle.

The gooseneck trailer hitch 11 has a post 17 with an upper end 18, an elbow 19, a lower end 20, a horizontal component 21, and a vertical component 22. The upper end 18 of post 12 is fixedly attached to front facing portion 12 of trailer 10. The lower end 20 of post 17 is attached to a coupler 25. The coupler 25 has a top portion 27 and a bottom portion 26, the top portion 27 and the bottom portion 26 having the same directional orientations, respectively, as the front facing portion 12 and rear facing portion 13 of trailer 10.

Attached to the front of the vertical post 20 is a locking device 37 that slides vertically through a sleeve 38 welded to the vertical post 20. The locking device 37 passes through the hole 34 in the lower portion 26 and hole 35 in the upper portion 27 of the coupler 25 to lock or secure the gooseneck hitch to the towing or pulling vehicle.

Figure 2:
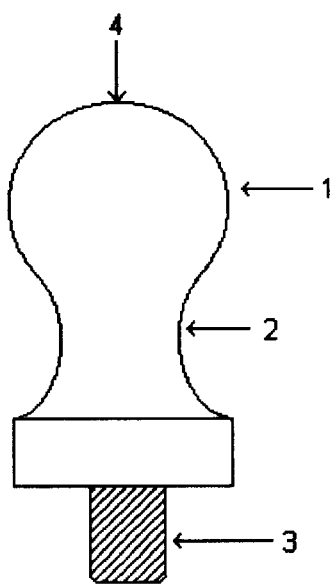
FIG. 2 is a side view of the towing ball used by a Gooseneck Trailer Hitch.
Figure 5:
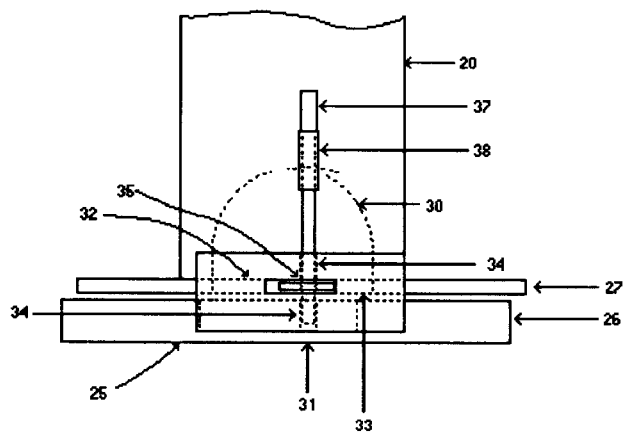
FIG. 5 is a front view of the Gooseneck Trailer Coupler in the closed or secured position.

FIG. 2. discloses a typical towing ball 4 that is attached to the towing or pulling vehicle by the attachment stem 3 on the bottom of the ball 4. The circumference at the largest portion of the ball 1 is 2 5/16", while the neck of the ball 2 is approximately 1 7/8". When the coupler 25-FIG. 1 is lowered on the ball 4, the lower portion 26-FIG. 1 of the coupler 25-FIG. 1 is moved to the closed position, FIG. 5, the securing pin 37-FIG. 5 is inserted in holes 34-FIG. 5 and 35-FIG. 5 which are aligned and the gooseneck hitch is secured to the towing or pulling vehicle.

Figure 3:
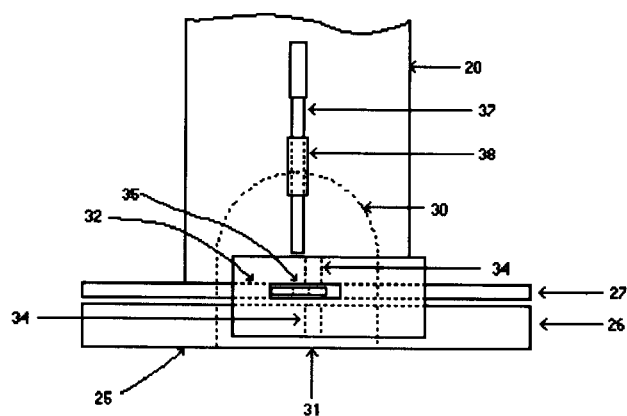
FIG. 3 is a front view of the Gooseneck Trailer Coupler in the open position, ready to receive the towing ball.

FIG. 3 discloses the coupler 25 for the gooseneck trailer hitch 11 located at the bottom of the front vertical post 17 attached at the lower end 20, in the open position or ready to accept the 2 5/16" ball of the towing or pulling vehicle.

The top portion 27 of the coupler 25 is welded to the vertical post 20 and has a 2 5/16" diameter circular hole 32 machined in the center. A concave ball receptacle 30 is machined in the bottom of the vertical post 20. The bottom portion of the coupler 26 has a 2 5/16" circular hole 31 machined in the center and is attached to the upper portion of the coupler 27 in the center rear by a bolt 39 that is welded to prevent removal. The bottom portion 26 of the coupler 25 and the top portion 27 of the coupler 25 have a circular hole in the front, 34 and 35 that when coupler 25 is in the closed position align allowing a pin 37 to lock them in this position, FIG. 5 to keep the coupler 25 attached to the towing or pulling vehicle.

Figure 4:
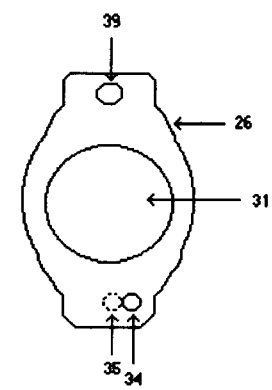
FIG. 4 is a bottom view of the Gooseneck Trailer Coupler in the open position, ready to receive the towing ball.

FIG. 4 discloses a bottom view of the coupler assembly 25 as depicted in FIG. 3.

FIG. 5 discloses the coupler 25 for the gooseneck trailer hitch 11 located at the bottom of the front vertical post 17 attached at the lower end 20, in the closed position or locked position around the 2 5/16" ball 4 of the towing or pulling vehicle.

The lower portion 26 of the coupler 25 is swiveled to the locked or secure position aligning the securing pin holes 34 and 35, and the locking pin 37 is lowered through the sleeve 38 and into the holes 34 and 35 locking the coupler 25 around the towing ball 4. The diameter of the center hole 31 in the lower portion 26 of the coupler 25 remains 2 5/16" and the diameter of the center hole 32 and the upper portion 27 of the coupler 25 remains 2 5/16" but the resultant configuration of the cavity in the coupler 25 leaves a semi-circular ledge 33 between the upper portion 27 and the lower portion 26 of the coupler 25.

Figure 6:
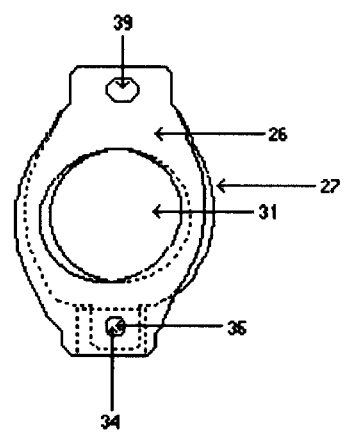
FIG. 6 is a bottom view of the Gooseneck Trailer Coupler in the dosed position.

FIG. 6 discloses a bottom view of the coupler assembly depicted in FIG. 5.

Figure 7:
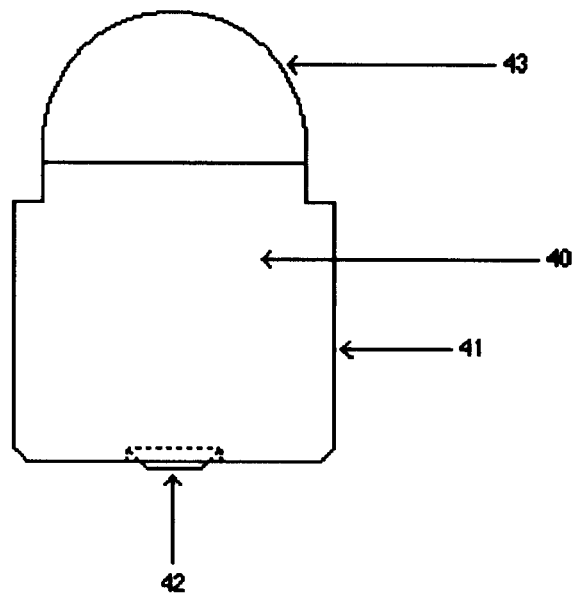
FIG. 7 is a side view of the invention in the closed position or ready to insert in the Gooseneck Trailer Hitch configuration.

FIG. 7 discloses an external view of the invention 40 showing the sliding top portion 43, the lock body portion 41, and the barrel lock 42, in the closed or ready to insert into the coupler 25.

Figure 8:
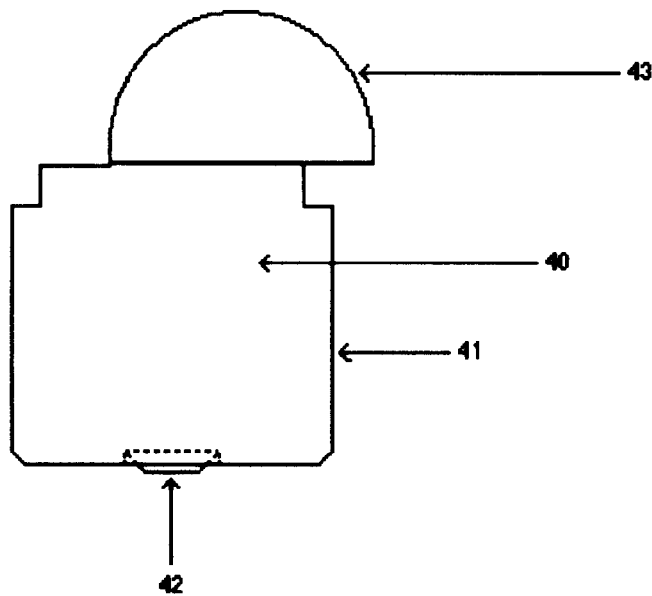
FIG. 8 is a side view of the invention in the locked position.

FIG. 8 discloses an external view of the invention 40 showing the sliding top portion 43, the lock body portion 41, and the barrel lock 42, in the locked position.

Figure 9:
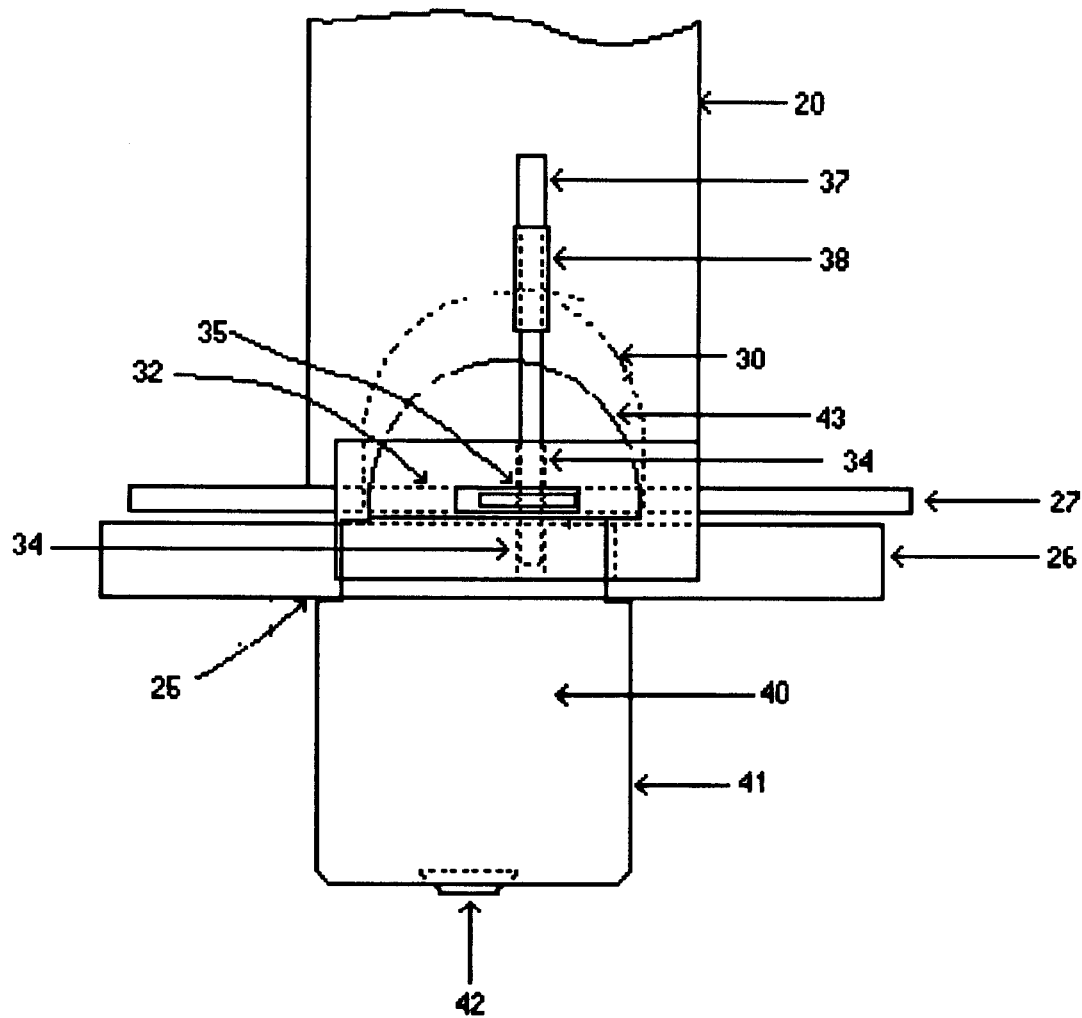
FIG. 9 is a front view of the Gooseneck Trailer Coupler with the invention inserted and locked in the Coupler.

FIG. 9 discloses the coupler 25 for the gooseneck trailer hitch 11, with the invention 40 inserted in the coupler 25 in the closed or locked position FIG. 5. The body 41 of the invention 40 fits securely in the lower portion 26 of the coupler 25 with the sliding top 43 of the invention 40 securely fitting in the machined recess 30 of the vertical post. The sliding top 43 of the invention 40 overlaps the lower portion 26 of the coupler 25 preventing the removal of the invention 40 from the coupler 40. The same principle that prevents the towing ball 4 from being expelled from a locked or secured coupler 25 applies to the invention 40.

Figure 10:
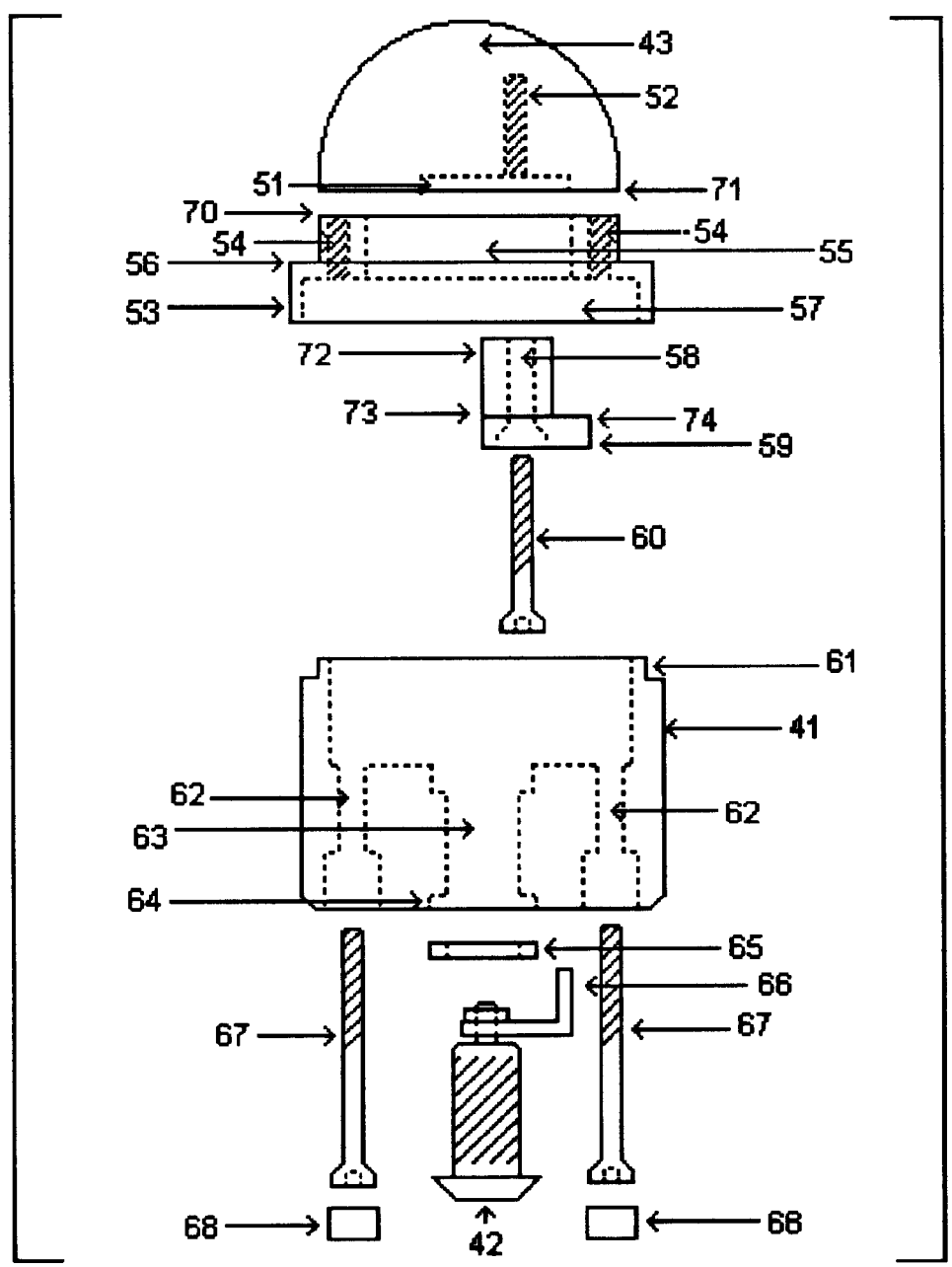
FIG. 10 is an exploded view of the invention.

FIG. 10 discloses an exploded view of the invention 40. The sliding top 43 has a radius machined to fit the socket 30 machined into the vertical post 20. A slot 51 is machined in the bottom of the sliding top 43 to accept the top of the slider 59. A tapped hole 52 accepts the socket head screw 60.

The intermediary piece 53 has a sliding surface 70 that mates with the bottom sliding surface 71 of the sliding top 43. A circumferental edge 56 is machined around the intermediary piece 53 that fits the lower portion 26 hole of the coupler 25. The bottom of the intermediary piece 53 is machined to accept the circumference 61 of the bottom piece 41. A sliding grove 55 is machined through the intermediate piece 53 to accept the upper portion 72 of the slider 59. Two holes 54 are tapped to accept the socket head screws 67.

The slider 59 is machined to allow the top portion 72 to fit through the sliding grove 55 of the intermediary piece 53 while the bottom part 73 of the slider 59 comes to rest on the underside 57 of the intermediary piece 53. A through-hole 58 is drilled and countersunk to accept socket head screw 60 which fits the threaded hole 52 in the top piece. The offset machining 74 of the slider 59 allows the sliding top 43 to mate with the sliding surface 70 of the intermediary piece 53 in the unlocked or insertion position, FIG. 7.

The bottom portion 41 has a ridge 61 machined around the top to fit into 57 of the intermediary piece 53. Two holes 62 are through-drilled and countersunk to accept the socket head screws 67 which fit into the threaded hole 54 in the intermediary piece 53. A hole 63 is machined through the center of the bottom piece 41 and is countersunk 64 on the bottom to accept the locking mechanism 42 and a nut 65 is installed to secure the locking mechanism 42 in the bottom portion 41.

ASSEMBLY: The top portion 43 is mated with the intermediary piece 53 at the sliding surfaces 71 and 70, The slider 59 is inserted through the sliding slot 55 in the intermediary piece 53 into the slot 51 on the bottom of the top piece 43 and the socket head screw 60 is inserted through the countersunk hole 58 in the slider 59 and screwed into the threaded hole 52 in the top piece 43. The grove 61 on the top of the bottom portion 41 is mated with the bottom of the assembled top 43 and intermediary 53 portions with the holes 62 in the bottom portion 41 aligned with the threaded holes 54 in the assembled section and the socket head screws 68 inserted and attached. The plugs 68 are inserted into the countersunk holes 62 of the bottom portion 41 and welded in place.

OPERATION: To Lock: The assembled invention 40-FIG. 7 is inserted into the hole 31-FIG. 3 in the coupler 25 as far as it will go due to the ridge 61-FIG. 10. The lower portion 26 of the coupler 25 is moved to the locked or secured position FIG. 5; the invention 40 is in a configuration at this point as depicted in FIG. 8. The barrel lock 42-FIG. 7 key is turned 90 degrees which moves locking tang 66-FIG. 10 90 degrees placing the locking tang 66 behind the slider 59-FIG. 10 preventing the slider 59-FIG. 10 and thus the top portion 43 from moving; the key is removed from the barrel lock 42 and the invention 40 is secured in the coupler 25 until unlocked.

TO UNLOCK: Insert the key into the barrel lock 42-FIG. 10 and turn 90 degrees which moves the locking tang 66-FIG. 10 90 degrees. Open the lower portion 26 of the coupler 25 which moves the top section 42 of the invention 40 in alignment with the bottom portion 41 and the invention 40 can be removed from the coupler 25.

It is to be understood that the present invention is not limited to the embodiment described above, but encompasses any and all embodiments within the scope of the following claim.

What is claimed is:

1. I claim a locking device for use with a gooseneck trailer, the gooseneck trailer having a post with upper and lower ends, the upper end being attached to a trailer and the lower end being attached to a coupler, the coupler having a receiver for a towing ball and being adapted for releasable attachment to a towing vehicle, said locking devise comprising:

(A) a lock adapted to be inserted into the coupler receiver, said lock having a lock body portion and a rounded top for fitting into a fixed, upper, portion of the coupler receiver wherein when a moveable, lower, portion of the coupler receiver is moved to a locked position, the bottom portion of said locking device moves to an offset position with the moveable, lower, portion of the coupler receiver, (B) when in the offset position, said rounded top is adapted to secure the locking device in the trailer receiver coupler, (C) a key operated barrel lock in said lock body portion and a locking tang, which is attached to an end of the key operated barrel lock, wherein said locking tang is moved behind a slider which is attached to the rounded top thereby locking said bottom portion in said offset position and preventing movement of the rounded top relative to the lock body portion.

(D) said locking device will remain in the coupler receiver until the locking tang is moved from behind the slider and the receiver coupler is moved to the open position.

(E) with said locking device secured in the trailer receiver coupler, attachment to a towing vehicle is prevented.

\* \* \* \* \*